(12) United States Patent
Birkmayer et al.

(10) Patent No.: US 11,502,567 B2
(45) Date of Patent: Nov. 15, 2022

(54) STATOR WINDING FOR A ROTATING ELECTRICAL MACHINE

(71) Applicant: Rolls-Royce Deutschland Ltd & Co KG, Blankenfelde-Mahlow (DE)

(72) Inventors: Wolfram Siegfried Birkmayer, Röttenbach (DE); Stefan Koschik, Taufkirchen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 192 days.

(21) Appl. No.: 16/652,732

(22) PCT Filed: Sep. 27, 2018

(86) PCT No.: PCT/EP2018/076225
§ 371 (c)(1),
(2) Date: Apr. 1, 2020

(87) PCT Pub. No.: WO2019/068542
PCT Pub. Date: Apr. 11, 2019

(65) Prior Publication Data
US 2020/0244127 A1 Jul. 30, 2020

(30) Foreign Application Priority Data
Oct. 6, 2017 (DE) .......................... 102017217751.9

(51) Int. Cl.
*H02K 3/28* (2006.01)
*H02K 3/52* (2006.01)
(Continued)

(52) U.S. Cl.
CPC ................ *H02K 3/28* (2013.01); *H02K 1/14* (2013.01); *H02K 3/521* (2013.01); *H02K 11/20* (2016.01); *H02K 11/33* (2016.01)

(58) Field of Classification Search
CPC .......... H02K 3/18; H02K 21/48; H02K 21/16; H02K 3/28; H02K 11/33; H02K 3/521;
(Continued)

(56) References Cited

U.S. PATENT DOCUMENTS 4,045,718 A     8/1977 Gray
4,450,396 A *   5/1984 Thornton .................. H02P 6/16
                                                                                                                          318/696
(Continued)

FOREIGN PATENT DOCUMENTS

JP          2008271630 A     11/2008
WO     WO2012052817 A1    4/2012
(Continued)

OTHER PUBLICATIONS

International Search Report and the Written Opinion for International Patent Application PCT/EP2018/076225 dated Jan. 25, 2019.
(Continued)

*Primary Examiner* — Alex W Mok
(74) *Attorney, Agent, or Firm* — Lempia Summerfield Katz LLC

(57) ABSTRACT

The disclosure relates to a stator for a rotating electrical machine. The stator includes: a laminated core which provides stator teeth with respect to an air gap of the rotating electrical machine, and a stator winding which has a plurality of tooth windings, wherein a respective one of the tooth windings is arranged on a respective one of the stator teeth and has a respective first electrical conductor arranged in a plurality of turns running around the respective stator tooth. The disclosure is based on the object of improving the electrical safety with respect to short circuits in the region of the stator winding. It is proposed that the respective tooth winding has a respective second electrical conductor which is electrically insulated from the first electrical conductor
(Continued)

and has a plurality of turns arranged in a manner running around the respective stator tooth, wherein the respective turns of the first and second electrical conductors are arranged in a bifilar manner.

14 Claims, 6 Drawing Sheets

(51) Int. Cl.
    *H02K 11/33*     (2016.01)
    *H02K 1/14*     (2006.01)
    *H02K 11/20*     (2016.01)

(58) Field of Classification Search
    CPC ...... H02K 1/14; H02K 11/20; H02K 2213/06; H02K 11/27; H02P 25/22
    USPC .......................................................... 310/68 D
    See application file for complete search history.

(56) References Cited

U.S. PATENT DOCUMENTS

| | | | | |
|---|---|---|---|---|
| 2011/0241591 | A1* | 10/2011 | Meynrd | H02K 19/34 363/71 |
| 2012/0091940 | A1* | 4/2012 | Nashiki | H02K 19/103 310/46 |
| 2014/0062269 | A1* | 3/2014 | Crane | H02K 11/33 310/68 R |
| 2018/0287449 | A1* | 10/2018 | Iga | H01R 25/168 |

FOREIGN PATENT DOCUMENTS

| | | |
|---|---|---|
| WO | WO2016030168 A1 | 3/2016 |
| WO | WO2017061608 A1 | 4/2017 |

OTHER PUBLICATIONS

Jack, Alan G., Barrie C. Mecrow, and James A. Haylock. "A comparative study of permanent magnet and switched reluctance motors for high-performance fault-tolerant applications." IEEE transactions on industry applications 32.4 (1996): 889-895.

\* cited by examiner

STATOR WINDING FOR A ROTATING ELECTRICAL MACHINE

The present patent document is a § 371 nationalization of PCT Application Serial No. PCT/EP2018/076225, filed Sep. 27, 2018, designating the United States, which is hereby incorporated by reference, and this patent document also claims the benefit of German Patent Application No. 10 2017 217 751.9, filed Oct. 6, 2017, which is also hereby incorporated by reference.

TECHNICAL FIELD

The disclosure relates to a stator for a rotating electrical machine, having a laminated core which provides stator teeth with respect to an air gap of the rotating electrical machine, and a stator winding which has a plurality of tooth windings, wherein a respective one of the tooth windings is arranged on a respective one of the stator teeth and has a respective first electrical conductor which is arranged in a plurality of turns running around the respective stator tooth. The disclosure also relates to a rotating electrical machine having a stator and a rotor arranged in a rotatable manner with respect to the stator. The disclosure also relates to an electrical drive device having an inverter for providing a multiphase electrical AC voltage, wherein, in order to provide a respective phase of the multiphase electrical AC voltage, the inverter has, for each phase, at least one inverter unit assigned to the respective phase, and a rotating electrical machine having a stator and a rotor arranged in a rotatable manner with respect to the stator, wherein the stator has: a laminated core which provides stator teeth with respect to an air gap of the rotating electrical machine formed between the stator and the rotor, and a stator winding which has a plurality of tooth windings assigned to the respective phases of the multiphase electrical AC voltage, wherein a respective one of the tooth windings is arranged on a respective one of the stator teeth and has a respective first electrical conductor which is arranged in a plurality of turns running around the respective stator tooth.

BACKGROUND

Stators for rotating electrical machines, rotating electrical machines having stators, and electrical drive devices of the generic type are extensively known in the prior art, with the result that there is no need for separate documentary evidence of this. A stator which generally provides a substantially circular opening for accommodating a rotor is fundamentally provided in a rotating electrical machine. The rotor is arranged in a rotatably mounted manner in the opening, wherein an air gap is formed between the rotor and the stator. This design is also referred to as an internal rotor. In addition, designs are also known in which the rotor radially surrounds the stator. Such designs are also called external rotors.

A rotating electrical machine is an apparatus which converts electrical energy into mechanical energy, (in particular, kinetic energy in a motor mode), and/or mechanical energy into electrical energy in a generator mode. The movement is generally a rotational movement carried out by the rotor. In contrast to the rotor, the stator is generally arranged in a rotationally fixed manner, that is to say a rotational movement is a rotational movement of the rotor with respect to the stator.

At least during intended operation of the rotating electrical machine, the stator and the rotor are linked by a magnetic flux, as a result of which the force effect, namely the torque, is generated in the motor mode and rotates the rotor with respect to the stator, and mechanical energy supplied to the rotor in the form of a rotation in the generator mode is converted into electrical energy. For this purpose, the stator and the rotor each have a winding through which a current flows. In the stator or in the rotor, the winding may also be formed or supplemented by a permanent magnet.

Rotating electrical machines of the generic type are, for example, rotating field machines which are connected to a multiphase, in particular three-phase, electrical AC voltage network, for example asynchronous machines, synchronous machines, synchronous machines with a damper cage, or the like.

Especially in multiphase rotating field machines, in particular having a permanently excited rotor, it proves to be problematic if a winding short circuit occurs inside the stator winding. In such rotating electrical machines in particular, the problem exists that, in the case of a winding short circuit during intended operation, a large electrical current may be induced and may result in thermal destruction of the stator winding. This proves to be particularly dangerous not only, but particularly, in aircraft in which permanently excited rotating field machines are used, which is why considerations for an improvement have already been undertaken in the prior art, to be precise, for example, in the publication "A Comparative Study of Permanent Magnet and Switched Reluctance Motors for High-Performance Fault-Tolerant Applications" by A. G. Jack et al., IEEE Transactions on Industry Applications, Vol. 32, number 4, July/August 1996. Although improvements may be achieved by the study disclosed here, further problems nevertheless remain.

The remaining problems have hitherto been solved by complicated mechanical apparatuses, for example structures, which mechanically enlarge the air gap in the event of a fault by the movable rotor and/or stator, increased insulation or an appropriate electromagnetic design, for example, by single-layer windings or the like, but losses in the efficiency and/or the power density of the rotating electrical machine may arise as a result.

SUMMARY AND DESCRIPTION

The disclosure is therefore based on the object of improving the electrical safety with respect to short circuits in the region of the stator winding.

The scope of the present disclosure is defined solely by the appended claims and is not affected to any degree by the statements within this summary. The present embodiments may obviate one or more of the drawbacks or limitations in the related art.

As a solution, the disclosure proposes a stator, a rotating electrical machine, and an electrical drive device.

With respect to a stator of the generic type, it is proposed, in particular, that the respective tooth winding has a respective second electrical conductor which is electrically insulated from the first electrical conductor and has a plurality of turns arranged in a manner running around the respective stator tooth, wherein the respective turns of the first and second electrical conductors are arranged in a bifilar manner.

With respect to a rotating electrical machine of the generic type, it is proposed, in particular, that the stator is designed according to the disclosure.

With respect to an electrical drive device, it is proposed, in particular, that the respective tooth winding has a respective second electrical conductor which is electrically insulated from the respective first electrical conductor and has a plurality of turns arranged in a manner running around the respective stator tooth, and the inverter unit of a respective phase has a respective first phase module and a respective second phase module which both provide the same respective electrical phase of the multiphase electrical AC voltage in an electrically isolated manner, and wherein the respective first electrical conductor is electrically connected to the corresponding first phase module and the respective second electrical conductor is electrically connected to the corresponding second phase module.

The stator winding of the stator includes all of the electrical conductors which may be connected to the multiphase AC voltage network in order to have an electrical current flowing through it on the basis thereof. The stator winding therefore provides a stator-side magnetic field which is linked to a magnetic field of the rotor in order to establish the electromagnetic coupling of the stator and of the rotor. The stator winding may be arranged on the stator teeth of the laminated core which is used to guide the magnetic field provided by the stator winding. The stator teeth may be arranged substantially parallel to an axis of rotation of the rotor in a longitudinal extent. Opposite the air gap, the stator teeth may be connected by the laminated core, as a result of which a magnetic return with respect to the magnetic flux is provided.

The stator teeth at least partially have tooth windings. Provision may be made for each stator tooth to have its own tooth winding. However, provision is also occasionally made for some of the stator teeth to be arranged without windings, with the result that special guidance of the magnetic flux may be achieved.

Such stator designs are also known, inter alia, from the above-mentioned publication. If a tooth winding is provided on a stator tooth, the respective tooth winding of the tooth windings is arranged on the respective stator tooth of the stator teeth and has the respective first electrical conductor. The first electrical conductor is used to conduct the electrical current, with the result that the magnetic flux may be provided on the stator side in a predefined manner. The respective first electrical conductor is arranged in a plurality of turns running around the respective stator tooth.

The individual turns may be arranged in a manner electrically insulated from one another, with the result that accordingly a high magnetic potential may be achieved with a predefined electrical current. The electrical insulation may be achieved by appropriately coating the first electrical conductor or by appropriately arranging the turns above one another in an electrically insulated manner. The first electrical conductor itself may be formed from a material which provides good electrical conductivity, (e.g., copper, aluminum, silver, alloys thereof, and/or the like). The electrical insulation may be formed by a dielectric material having a very low electrical conductivity, (e.g., a plastic, a composite material, in particular in the form of a film, a varnish and/or the like).

According to a first aspect, the respective tooth winding has a respective second electrical conductor which is electrically insulated from the first electrical conductor and has a plurality of turns arranged in a manner running around the respective stator tooth, wherein the respective turns of the first and second electrical conductors are arranged in a bifilar manner. In particular, if the first and second electrical conductors have the same number of turns, it is therefore possible to achieve the situation in which the electrical current which is applied to the respective tooth winding is divided between two substantially identical partial tooth windings, with the result that the electromagnetic effect may be achieved overall, as may also be achieved with a single tooth winding.

In this case, a turn short circuit between two adjacently arranged turns results in a short circuit between the first electrical conductor and the second electrical conductor of a respective tooth winding. This avoids the situation in which, if there is only a single electrical conductor for the tooth winding, there is a short circuit inside the one electrical conductor and a particularly unfavorable short-circuit effect would therefore be the result on account of the magnetic induction. As a result of the fact that the short circuit is present between two electrical conductors which are isolated from one another, a substantially immediate winding short circuit cannot take place, with the result that the unfavorable short-circuit effect described above with respect to a single electrical conductor of the tooth winding may be mitigated. This is because, for the current to flow through the turn short circuit formed in this case, it is necessary for the electrical current to have to at least partially flow through the first and second conductors, as a result of which it is also possible to achieve, in particular, current-reducing effects while noting electrical resistances of the first and second electrical conductors and possibly inductances which need to be taken into account, with the result that the winding short circuit has a considerably lower effect than is conventional in the prior art. Overall, the thermal load in the case of a winding short circuit may be considerably reduced as a result.

As a result of the fact that the turns of the first and second electrical conductors are arranged in a bifilar manner, a winding short circuit will therefore initially occur between the first and second electrical conductors. If an electrical charge is applied to the partial tooth windings formed by the first and second electrical conductors, the effect of a winding short circuit may therefore be considerably reduced. It is even possible to determine the turn short circuit and to shut down the rotating electrical machine in a safe mode in order to avoid dangerous operating states. Overall, the safety may be considerably improved.

With respect to the first aspect, it is also proposed that the respective first electrical conductor and the respective second electrical conductor are electrically connected in parallel. As a result, each of the tooth windings is formed in two parts, namely by virtue of a respective first partial tooth winding and a respective second partial tooth winding which are wound together onto the respective stator tooth and are connected in parallel. In the event of a winding short circuit in which the short circuit may initially occur between the first and second electrical conductors of the respective tooth winding on account of the winding technology, there is a remaining residual inductance and a limited electrical conductivity provided by the first and second electrical conductors, with the result that a current flow may be reduced. As a result, the thermal load on account of the winding short circuit may be reduced, as a result of which the safety may be improved further. In particular, an emergency mode may be provided as a result in order to be able to shut down the rotating electrical machine in a safe method. It proves to be particularly advantageous if the first and second electrical conductors each provide substantially the same number of turns for this purpose, e.g., exactly the same number of turns. Provision may be made for an electrical current of the tooth winding to be divided between the first and second electrical conductors. The first and second electrical conductors may conduct approximately the same electrical current, which currents in total form the electrical current of the tooth winding.

It is also proposed that at least one of the electrical conductors is connected in series with a fuse element. The fuse element may form an overcurrent protection device which trips when a predefined trip current is reached and prevents the further flow of current. The fuse element may be in the form of a safety fuse or the like, for example. The fuse element may be connected in series with a respective one of the first and second conductors. Series circuits formed hereby may be connected in parallel. As a result, additional safety may be achieved by virtue of the fuse limiting the possible short-circuit current or interrupting the further flow of current in the event of a short-circuit current greater than the trip current.

The use of the disclosure in rotating electrical machines in the form of synchronous machines proves to be particularly advantageous. On account of the separately excited rotor, an electrical voltage may still be induced here even when AC voltage is no longer already applied to the stator winding, which electrical voltage may entail thermal overloading on account of the winding short circuit, to be precise, for example, when the rotor continues to be excited. The disclosure may considerably reduce the thermal load.

It also proves to be advantageous if the rotor of the rotating electrical machine, in particular of the synchronous machine, is in the form of a permanently excited rotor. This is because it is not possible to switch off the provision of the magnetic flux by the rotor in this case. As soon as the rotor rotates, an electrical voltage is also induced in the stator winding, which electrical voltage, in the event of a winding short circuit, may cause or at least intensify the above-mentioned problems at the stator winding, in particular at the respective tooth winding which is affected by a winding short circuit. The risks and dangerous states associated with this may be considerably reduced, in particular, in the case of permanently excited rotors, by the disclosure.

A second aspect of the disclosure is directed to the electrical drive device. In this case, the disclosure considers the fact that a tooth winding is formed from two partial tooth windings which are electrically isolated from one another and are formed by the respective first electrical conductor and by the respective second electrical conductor. In this case, the disclosure also considers the fact that the respective first electrical conductor and the respective second electrical conductor are operated in a manner electrically isolated from one another, with the result that insulation monitoring may be implemented between the circuits formed thereby, which insulation monitoring allows the electrical insulation of the partial tooth windings with respect to one another to be determined. In the basic variant of this second aspect, the turns of the respective first electrical conductor and of the respective second electrical conductor fundamentally do not need to be arranged in a bifilar manner.

In this second aspect, the respective inverter unit assigned to a respective phase includes respective first and second phase modules which are able to provide the respective phase of the multiphase electrical AC voltage in an electrically isolated manner. As a result of the fact that the respective first electrical conductor and the respective second electrical conductor are connected to the respective assigned first and second phase modules, it is therefore possible to provide electrically isolated circuits, between which insulation monitoring may be implemented.

The respective inverter unit may be formed, for example, by a separate clocked energy converter in the form of a single-phase electrical inverter. The inverter may naturally also be formed by a multi-level energy converter which is also referred to as a multi-level converter, MMC, M2C, or the like in English. The inverter unit has at least one respective first phase module and one respective second phase module which both provide the same electrical phase of the multiphase electrical AC voltage in an electrically isolated manner. This may be achieved by separate inverting clocked energy converters.

For example, provision may be made for each phase module to include a half-bridge circuit which has two switching elements connected in series and is connected to a DC voltage intermediate circuit of the inverter. The respective phase of the multiphase electrical AC voltage may be provided at a center tap. In addition, it is naturally possible to provide two half-bridge circuits which are connected in parallel and are operated in a complementary manner, with the result that the respective phase of the multiphase electrical AC voltage is provided between the respective center taps of the two half-bridge circuits. Such a circuit arrangement is also called a full-bridge circuit.

The laminated core which also forms the stator teeth includes a magnetizable material, for example sheet iron, in particular using an alloy, wherein the laminated core is formed from a stack of a plurality of individual sheets which are arranged in an electrically insulated manner with respect to one another in order to suppress the formation of an eddy current.

With respect to the second aspect which is directed to the electrical drive device, it may also be stated that the inverter is designed in a suitable manner in order to provide the multiphase electrical AC voltage. In this case, the inverter is designed in such a manner that it may provide at least as many phases of the multiphase AC voltage as are required for the intended operation of the rotating electrical machine.

The stator winding may have a multiphase, for example, three-phase, design, wherein each of the phases of the stator is connected to an inverter unit of the inverter assigned to the respective phase, with the result that an AC voltage of the multiphase AC voltage corresponding to the respective phase may be applied to the phase of the stator winding. Because the tooth winding of a respective one of the stator teeth has two parts and the same phase of the multiphase electrical AC voltage may be intended to be applied to the tooth winding, the inverter unit of the respective phase of the multiphase electrical AC voltage to be provided provides corresponding first and second phase modules which both provide the same electrical phase of the multiphase electrical AC voltage in an electrically isolated manner. One of the first and second electrical conductors of the respective tooth winding is respectively connected to each of the two phase modules, with the result that electrical isolation may also be achieved on the voltage supply side as a result of this structure. It is therefore possible to be able to identify not only turn short circuits but also to be able to capture faults with respect to the electrical insulation in the region of the winding connections. In addition, this configuration allows not only insulation faults to be determined, but also to be able to continue the intended operation of the electrical drive device if there is a single insulation fault. As a result, it is possible to output a warning message stating that an insulation fault has been determined and to prompt a maintenance or repair action as a result. The intended operation may be continued, for example, until the maintenance or repair is carried out. This is particularly advantageous for electrical drive devices in which high availability is important, for example, in safety-related devices or in drives as are used in the field of aviation. Here especially, a sudden failure of the electrical drive device would be particularly harmful. The disclosure may achieve the situation here in which at least partial operation may be maintained until appropriate maintenance or repair measures may be carried out.

In order to be able to improve the electrical isolation, provision may be made for the respective first phase modules to be connected to a common first DC voltage intermediate circuit of the inverter and for the respective second phase modules to be connected to a common second DC voltage intermediate circuit of the inverter. Good electrical isolation may be achieved as a result. It proves to be particularly advantageous if the first and second DC voltage intermediate circuits of the inverter are likewise DC-isolated from one another. This may be achieved by a clocked energy converter, for example, in the form of a DC/DC converter, in which DC isolation of the DC voltages to be coupled is provided.

For the second aspect, it proves to be particularly advantageous if the respective turns of the first and second electrical conductors of a respective one of the tooth windings are likewise arranged in a bifilar manner here. This makes it possible to improve the functionality and safety even further. The advantages and effects already mentioned with respect to the first aspect may thereby be advantageously combined with the second aspect, with the result that a reliable electrical drive device with high availability and interference immunity may be achieved overall.

In this case too, it proves to be particularly advantageous if the rotating electrical machine is in the form of a synchronous machine. As already explained above with respect to the first aspect, the advantageous effects may be used particularly well in synchronous machines, in particular.

It is also proposed that the rotor is in the form of a permanently excited rotor. This not only allows the electrical drive device to be used with the advantages afforded by a permanently excited rotor, but also allows the risks and problems caused thereby to be considerably reduced, with the result that the electrical drive device may also be successfully used in critical safety-related applications.

It proves to be particularly advantageous if the electrical drive device has a monitoring unit configured to monitor the respective first and second electrical conductors of the tooth windings with respect to an insulation fault between the respective first electrical conductor and the respective second electrical conductor. As a result of the fact that there may be electrical isolation between the respective first electrical conductor and the respective second electrical conductor of the tooth windings, the electrical insulation may be monitored by the monitoring unit which is suitably designed.

It also proves to be advantageous if the respective first phase module and the respective second phase module are connected to DC voltage intermediate circuits of the inverter which are electrically isolated from one another because the monitoring unit then, in the simplest case, only needs to monitor the electrical insulation of the first DC voltage intermediate circuit with respect to the second DC voltage intermediate circuit in order to be able to determine an insulation fault on any of the tooth windings. As a result, the monitoring unit may have a particularly simple design. In this case, the phase modules naturally allow the monitoring unit to perform its functionality in the intended manner.

The phase modules are then designed accordingly.

BRIEF DESCRIPTION OF THE DRAWINGS

Further advantages and effects emerge from the following exemplary embodiments on the basis of the accompanying figures. In the figures, identical reference signs denote identical features and functions.

DETAILED DESCRIPTION

Figure 1:
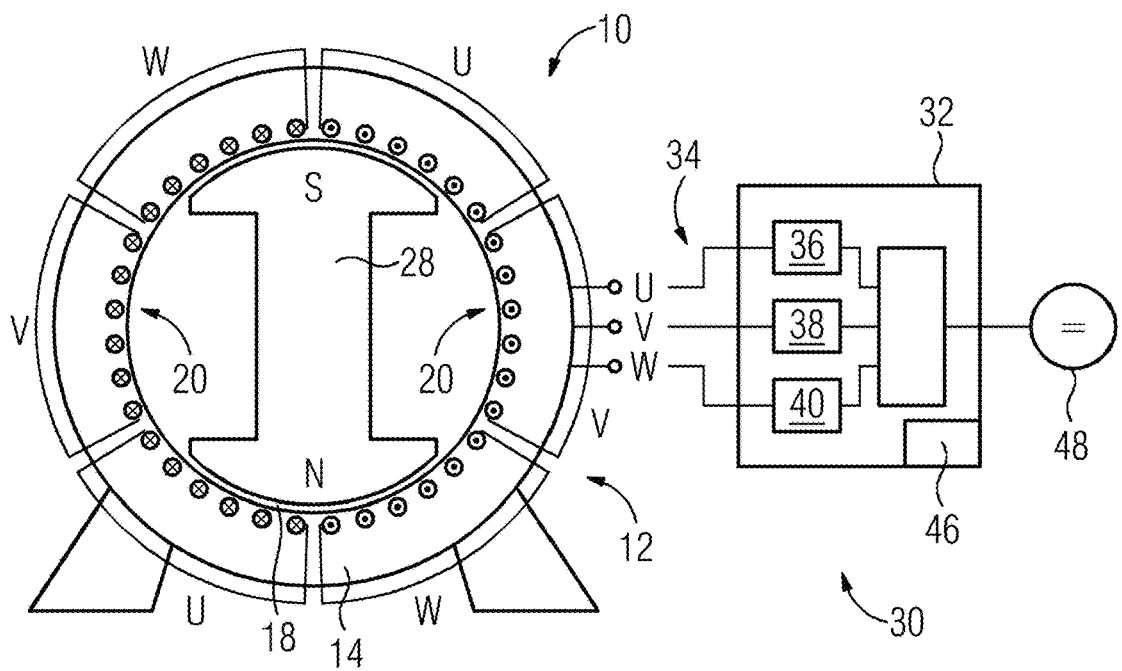
FIG. 1 shows a schematic sectional illustration of an example of a basic structure for a permanently excited three-phase synchronous machine as an internal rotor.

FIG. 1 shows a schematic sectional illustration of a fundamental design principle for a permanently excited synchronous machine 10 as a rotating electrical machine. It is clear from FIG. 1 that the synchronous machine 10 is in the form of an internal rotor in the present case. In other words, the synchronous machine 10 has a stator 12 having a through-opening which is not designated and in which a rotor 28 is arranged in a rotatably mounted manner.

The stator 12 has a laminated core 14 which provides stator teeth 16 (FIG. 2) with respect to an air gap 18 between the laminated core 14 of the stator 12 and the rotor 28. The stator 12 has a stator winding 20 which, in the present case, is designed for three-phase operation, that is to say is connected to a three-phase AC voltage 34 having phases U, V, W. During intended operation of the synchronous machine 10, the AC voltage 34 is accordingly applied to the stator winding 20.

In the present case, the rotor 28 is in the form of a salient pole rotor which includes permanent magnets (not designated) for providing the magnetic flux. The present configuration provides for the rotor 28 to have precisely one magnetic north pole and one magnetic south pole.

Figure 10:
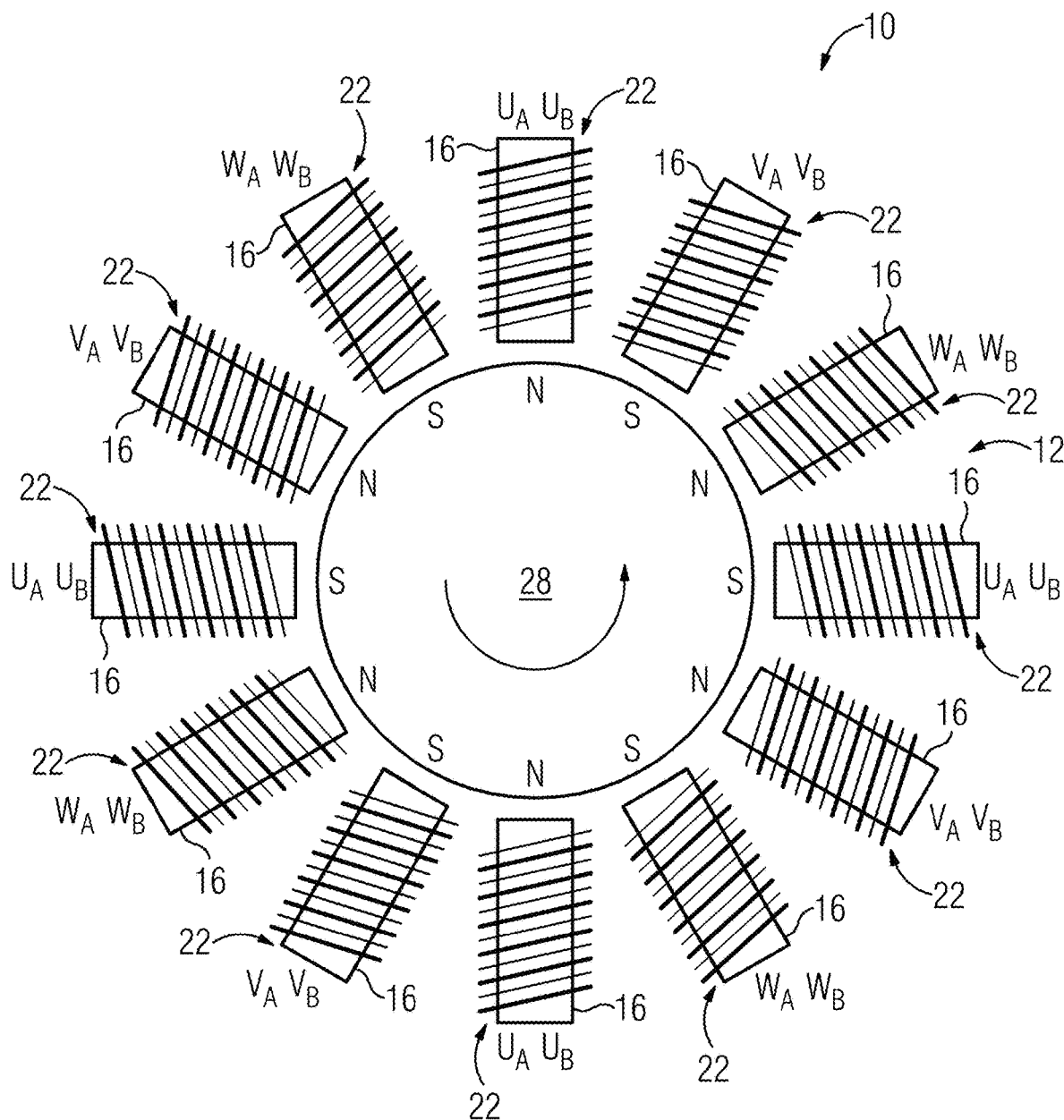
FIG. 10 shows a schematic illustration of a further configuration of an example of a permanently excited synchronous machine for operation with a three-phase electrical AC voltage.

In alternative configurations, more magnetic poles may also be provided in alternation in the circumferential direction transverse to an axis of rotation of the rotor 28 (FIG. 10).

The rotor 28 is rotatably mounted. As a result of the three-phase AC voltage 34, the phases U, V, W of which are each phase-shifted through 120°, a rotating magnetic field is provided during intended operation, which rotating magnetic field is linked to the permanently excited magnetic field provided by the rotor 28, with the result that a corresponding rotational movement of the rotor 28 may be caused in a motor mode. In the present case, provision is made for the synchronous machine 10 to be used as a drive motor for a propeller of an aircraft which is not illustrated any further. FIG. 1 schematically illustrates the sections of the stator winding 20 which are assigned to the respective phases.

The stator winding 20 of the synchronous machine 10 is connected to an accordingly three-phase inverter 32 which provides the electrical AC voltage 34 having the three phases U, V, W, for which purpose it in turn obtains the electrical energy required for intended operation from an energy source 48 which is not illustrated any further. In the present configuration, the energy source 48 is a DC voltage source which provides electrical energy from a suitable electrical energy store, for example, a rechargeable battery or the like. Alternatively, or additionally, fuel cells and/or the like or, in the case of stationary applications, an energy supply from a public energy supply network may naturally also be provided here.

In order to provide the phases U, V, W, the inverter 32 has assigned inverter units 36, 38, 40 which are formed by suitable clocked energy converters. For this purpose, each inverter unit 36, 38, 40 has its own half-bridge circuit (FIG. 12) which is connected to a DC voltage intermediate circuit (not illustrated any further in FIG. 1) of the inverter 32 in order to be supplied with electrical energy thereby. The half-bridge circuit in inverters is fundamentally known, which is why reference is made to the appropriate specialist literature with respect to further explanations thereof. It is only noted that the half-bridge circuit has a series circuit including two electronic switching elements which are connected to the respective intermediate circuit DC voltage of the inverter 32. The electronic switching elements are operated, by a control unit which is not illustrated any further, in a clock mode which provides clock patterns in the form of a PWM signal, for example. The corresponding phase U, V, W of the three-phase AC voltage 34 is then available at a respective center tap of the half-bridge circuits. Appropriate filtering is carried out by the inductance of the stator winding 20, with the result that an appropriate alternating current is established for each of the phases U, V, W, which alternating current may be virtually sinusoidal if the inverter units 36, 38, 40 are controlled appropriately.

Figure 2:
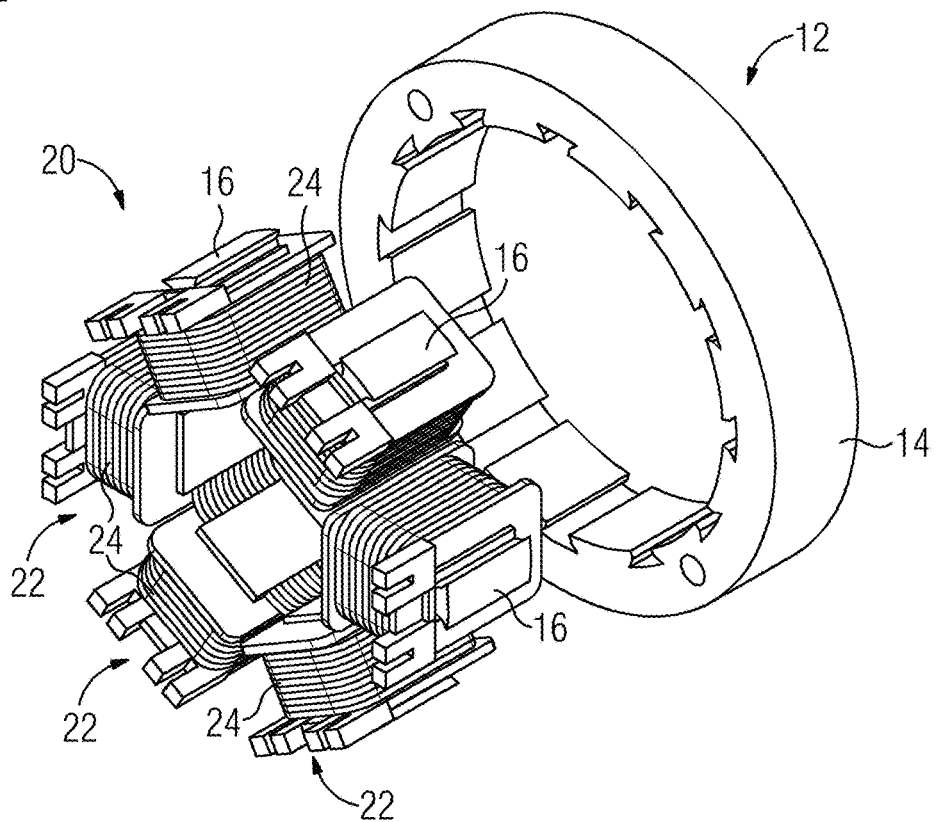
FIG. 2 shows a schematic perspective exploded view of an example of a structure of the stator of the synchronous machine according to FIG. 1 with tooth windings.

The inverter 32 forms an electrical drive device 30 together with the synchronous machine 10. FIG. 2 shows a schematic exploded illustration of the stator 12 of the synchronous machine 10. It may be seen that the stator 12 has the laminated core 14 in which stator teeth 16, which are fitted with respective tooth windings 22, may be joined to the annular laminated core 14 by a mechanical connecting unit which is not illustrated any further.

The stator winding 20 therefore has a plurality of tooth windings 22, wherein a respective one of the tooth windings 22 is arranged on a respective one of the stator teeth 16. The present configuration provides for each of the stator teeth 16 to have a corresponding tooth winding 22. In alternative design concepts, this does not need to be the case, but rather stator teeth 16 may also be provided without a corresponding tooth winding.

Each of the tooth windings 22 has a respective first electrical conductor 24 which is arranged in a plurality of turns running around the respective stator tooth 16. The tooth windings 22 are accordingly connected in the synchronous machine 10, with the result that the three-phase connection to the inverter 32 may be effected. However, this is not illustrated any further in the FIG.

Figure 3:
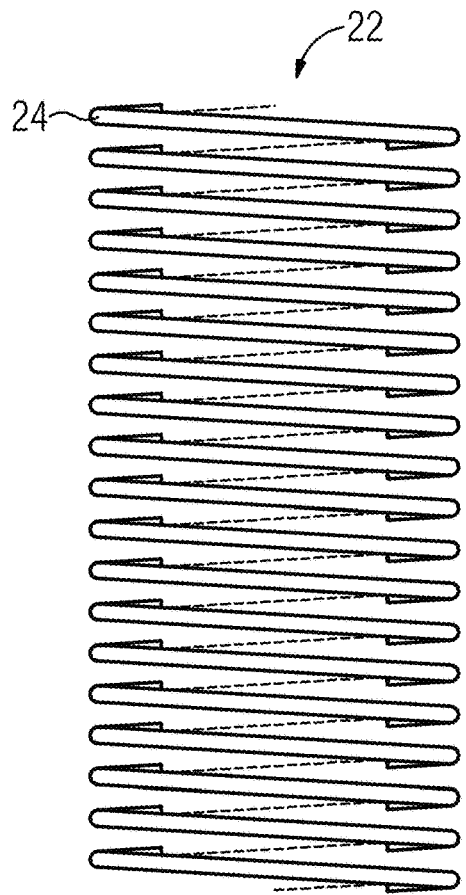
FIG. 3 shows a schematic illustration of an example of a tooth winding according to the prior art.

FIG. 3 now shows a schematic illustration of one of the tooth windings 22, in which the first electrical conductor 24 is wound around the stator tooth 16 which is not illustrated. In the present case, the tooth winding 22 is in the form of an elongated coil. Depending on the configuration and design, it is naturally also possible to provide for a multilayer winding to be provided in order to be able to achieve, for example, an accordingly high magnetic potential with a predefined electrical current.

Figure 4:
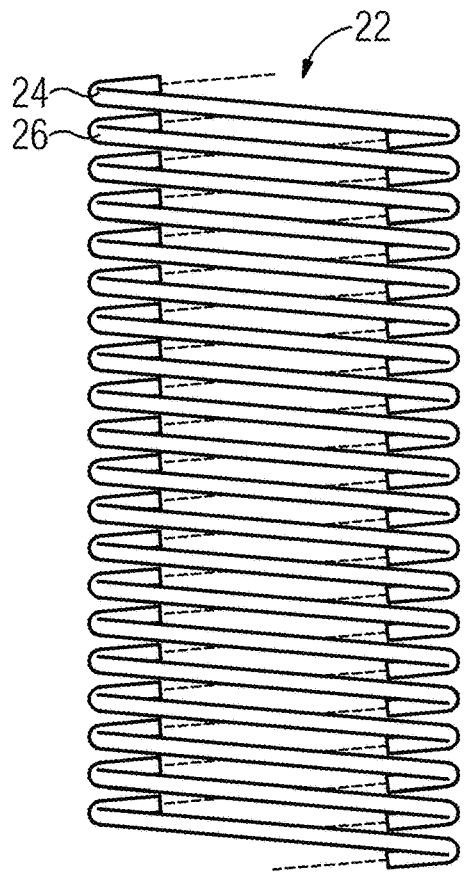
FIG. 4 shows a schematic illustration of an example of a tooth winding like FIG. 3, but in the form of a bifilar tooth winding.

FIG. 4 now shows a corresponding tooth winding 22, in which case the illustration corresponds to the illustration according to FIG. 3. It is clear from FIG. 4 that the tooth winding 22 has a respective second electrical conductor 26 which is electrically insulated from the first electrical conductor 24 and has a plurality of turns arranged in a manner running around the respective stator tooth 16. The respective turns of the first and second electrical conductors 24, 26 are arranged in a bifilar manner. That is to say, one turn of the first electrical conductor 24 is respectively arranged adjacent to a turn of the second electrical conductor 26 in the longitudinal extent of the tooth winding 22. This has the advantage that, in the event of a turn short circuit between two adjacently arranged turns, the turn short circuit occurs between the first electrical conductor and the second electrical conductor. Unlike in the tooth winding 22 according to FIG. 3, the turn short circuit therefore does not occur inside the winding formed by the first electrical conductor 24. This results in special advantages which shall be explained further based on FIG. 6.

Figure 6:
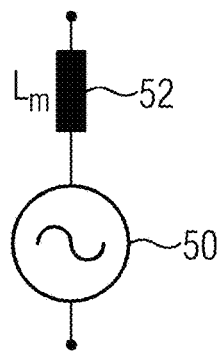
FIG. 6 shows a schematic equivalent circuit diagram illustration of the tooth winding according to FIG. 3.

FIG. 6 shows a schematic equivalent circuit diagram illustration of the functionality of the tooth winding 22 according to FIG. 3. During intended operation of the tooth winding 22 according to FIG. 3, that is to say without a turn short circuit, a voltage source is illustrated with the reference sign 50 and represents the electrical voltage induced in the tooth winding 22. The reference sign 52 is used to represent the inductance $L_m$ of the tooth winding. The functionality of this equivalent circuit diagram may be understood by a person skilled in the art, which is why further statements on this are dispensed with. Rather, reference is made to the appropriate specialist literature.

Figure 7:
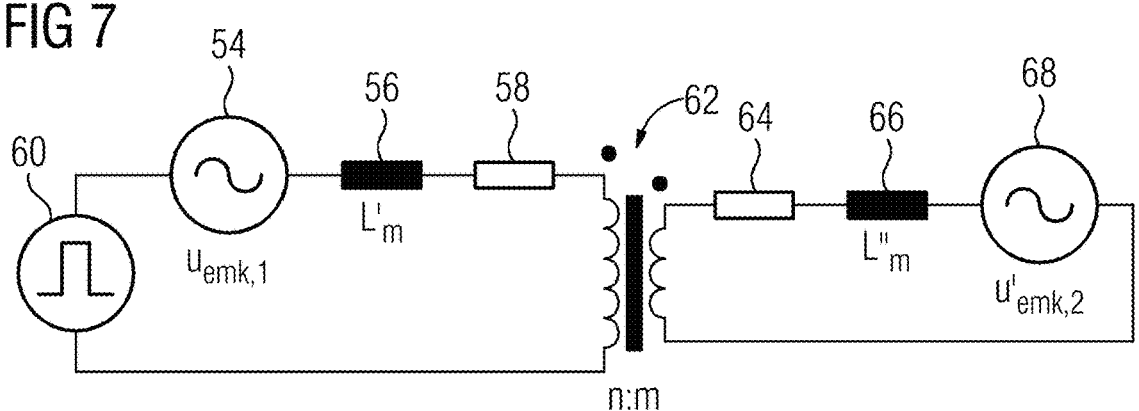
FIG. 7 shows a schematic equivalent circuit diagram illustration according to FIG. 6 in which a turn short circuit has occurred.

FIG. 7 now likewise shows a schematic equivalent circuit diagram illustration of the conditions when a turn short circuit occurs in the tooth winding 22 according to FIG. 3. As a result of the turn short circuit, a two-part winding is formed on the stator tooth 16, the effect of which is illustrated further using the equivalent circuit diagram according to FIG. 7. Reference sign 60 is used to denote a voltage source which, during intended operation of the synchronous machine 10, provides the corresponding one of the phases U, V, W at the tooth winding 22 according to FIG. 3. Reference sign 54 is used to represent the induced voltage $u_{emk,1}$ which is induced in the corresponding winding part of the tooth winding 22 on account of the conditions which are now present. Reference sign 56 is used to indicate a partial inductance $L'_m$ and reference sign 58 is used to indicate the electrical resistance of the corresponding part of the electrical conductor 24.

The corresponding symbols are likewise illustrated for the other part of the tooth winding 22. Reference sign 64 denotes the electrical resistance of the correspondingly assigned part of the electrical conductor 24 of the tooth winding 22 according to FIGS. 3 and 66 denotes the assigned electrical inductance $L''_m$ and reference sign 68 denotes the electrical voltage $u'_{emk,2}$ induced in this winding part of the tooth winding 22.

It may be seen that both winding parts, which are separated from one another by the turn short circuit, are additionally coupled to one another via a transformation 62. The respective values of the symbols and of the transformation 62 are dependent on the point of the tooth winding 22 at which the corresponding turn short circuit occurs. If an electrical current is actively fed in on the stator side using 60 or if the connection terminals are released, a very large current is induced in the secondary side, which includes the symbols 64, 66, 68, because the winding resistance 64 and the inductance 66 are very low. This results in the problems which have already been explained at the outset with respect to the enormous thermal and electrical load.

Figure 8:
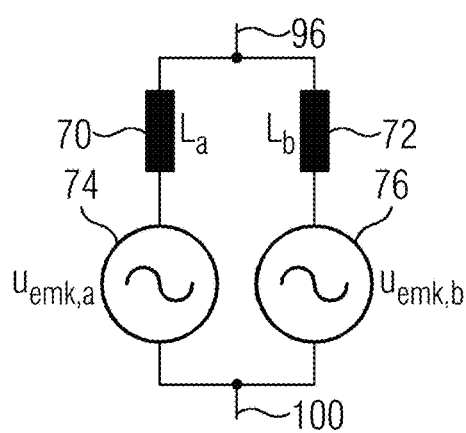
FIG. 8 shows a schematic equivalent circuit diagram illustration of the tooth winding according to FIG. 4.

FIG. 8 now shows a corresponding equivalent circuit diagram for the tooth winding 22 according to FIG. 4. It may be seen that each of the two electrical conductors 24, 26 forms a separate branch, wherein the branches are electrically connected in parallel. The branch of the electrical conductor 24 has the inductance $L_a$ which is denoted using the reference sign 70 and is connected in series with a voltage source $u_{emk,a}$ which is denoted using the reference sign 74. These two symbols 70, 74 represent the functionality during intended operation, that is to say when there is no turn short circuit. A branch including a series circuit with an inductance $L_b$ and a voltage source $u_{emk,b}$ which is denoted with the reference sign 76, is accordingly illustrated for the electrical conductor 26, wherein the inductance has the reference sign 72. Because both windings formed by the electrical conductors 24, 26 have substantially the same number of turns and have the same magnetic flux flowing through them, the parallel circuit according to FIG. 8 may be used to achieve a functionality like for the tooth winding 22 according to FIG. 3, the equivalent circuit diagram of which is illustrated according to FIG. 6.

Figure 9:
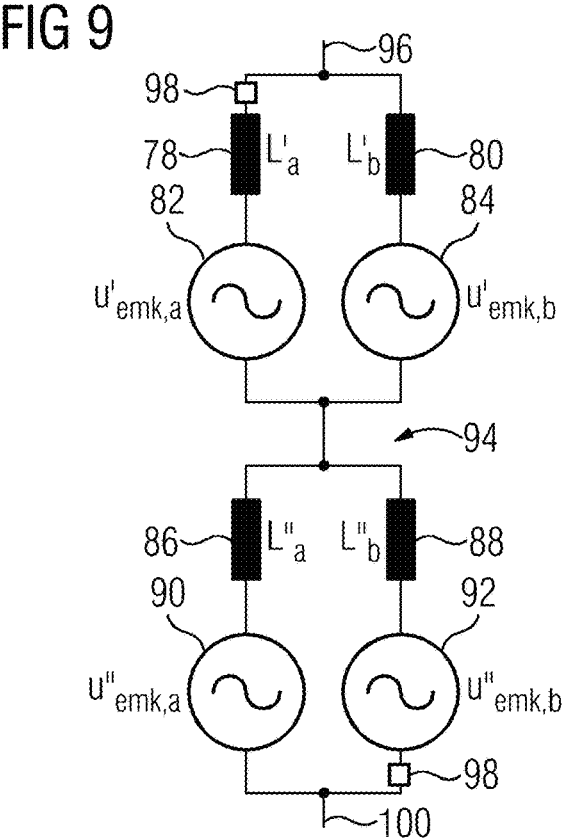
FIG. 9 shows a schematic equivalent circuit diagram illustration like FIG. 7, but for the tooth winding according to FIG. 4 when there is a turn short circuit.

FIG. 9 now shows the conditions according to FIG. 7, in which case, in the operating state illustrated according to FIG. 9, there is a turn short circuit between two adjacent turns of the first electrical conductor 24 and of the second electrical conductor 26. As is clear from the equivalent circuit diagram illustrated for this operating state according to FIG. 9, the circuit structure of the equivalent circuit diagram, which has already been explained according to FIG. 8, has been changed, as accordingly illustrated according to FIG. 9.

It is clear from FIG. 9 that each of the two electrical conductors 24, 26 now has two sections, wherein the respectively corresponding sections of the first and second electrical conductors 24, 26 are connected in parallel. The respective sections are connected in parallel at the point of the turn short circuit 94.

It may be seen that a first section of the electrical conductor 24 between a first connection point 96 of the tooth winding 22 and the winding short circuit 94 has the inductance $L'_a$ which is indicated with the reference sign 78 and is connected in series with a voltage source $u'_{emk,a}$ which has the reference sign 82. Accordingly, an inductance $u_b$ which is indicated with the reference sign 80 is illustrated as being connected in series with a voltage source $u'_{emk,b}$ which has the reference sign 84 for a corresponding first section of the electrical conductor 26 between the connection point 96 and the winding short circuit 94. These two sections are connected in parallel between the connection point 96 and the point 94.

Accordingly, between the winding short circuit 94 and a connection point 100 of the tooth winding 22, provision is made for a second section of the electrical conductor 24 to include an inductance $L''_a$ which has the reference sign 86 and is connected in series with a voltage source $u''_{emk,a}$ which has the reference sign 90. Accordingly, an inductance $L''_b$ which has the reference sign 88 and is connected in series with a voltage source $u''_{emk,b}$ which has the reference sign 92 is provided for a second section of the second electrical conductor 26. In this case too, these two series circuits are connected in parallel between the winding short circuit 94 and the connection point 100 of the tooth winding 22.

As is clear from FIG. 7, a transformer having two windings is produced in the case of the turn short circuit in the tooth winding 22, in which case a winding ratio of N-1/1 results here, wherein N is the number of turns, in comparison with FIG. 7. If an electrical current is actively applied to the tooth winding 22 on the stator side or the tooth winding 22 is released, a very large current is induced in a secondary side which is determined by the turn short circuit, because the winding resistance and the inductance are very low.

If, in contrast, a turn short circuit occurs between two adjacent turns in the system having the electrical conductors 24, 26 wound in a bifilar manner according to FIG. 4, the equivalent circuit diagram according to FIG. 9 results. The turn short circuit results here in a series circuit including two inductances connected in parallel. If a turn short circuit is present such that the inductances are approximately the same, an electrical current which is very low, (e.g., even zero), is established in the event of a short circuit. This is produced when the value of the inductance $L'_a$ is approximately the same as the inductance $L_b$ and, at the same time, the value of the inductance $L''_a$ corresponds approximately to the inductance $L''_b$.

In addition, in this operating state, the situation may arise in which the induced voltage $u'_{emk,a}$ is approximately equal to the induced voltage $u'_{emk,b}$ and, at the same time, the induced electrical voltage $u''_{emk,a}$ is also approximately equal to the induced voltage $u''_{emk,b}$. If the turn short circuit is not symmetrical, a circulating electrical current may form via the inductance $L'_a$ and $L'_b$ or $L''_a$ and $L''_b$, which current is formed via a respective overall inductance, to be precise $L'_a+L'_b$ or $L''_a+L''_b$ respectively, which is formed on account of the induced voltages, namely $u'_{emk,a}-u'_{emk,b}$ or $u''_{emk,a}-u''_{emk,b}$. An asymmetrical turn short circuit therefore acts like a current divider with respect to the supply from the stator, with the result that, in comparison with the turn short circuit according to FIG. 7, substantially no influence by the stator current needs to take place, as is present on account of the transformation 62 of the transformer according to FIG. 7. It is naturally also clear that, the closer a turn short circuit occurs to the connection points 96 or 100, the effect of the tooth winding 22 wound in a bifilar manner is reduced. This may be further reduced by an electrical drive device 30, as explained below.

It is also clear from FIG. 9 that, in a further configuration, each of the electrical conductors 24, 26 has a respective fuse element 98 which is in the form of a safety fuse in the present case. This makes it possible to achieve additional protection. This is because the short-circuit current may also be captured at the connection points 96, 100 in the event of a turn short circuit. As a result of the fuse elements 98, the short-circuit current may be interrupted when a trip current of the respective one of the fuse elements 98 is reached.

FIG. 10 shows a schematic illustration of a synchronous machine 10 which, in contrast to the synchronous machine 10 according to FIGS. 1 and 2, now has a twelve-pole design, rather than a six-pole design. Accordingly, the stator 12 has twelve stator teeth 16 which are arranged equidistantly in the circumferential direction. The rotor 28 is again arranged in a through-opening formed by the stator 12, which rotor likewise has a twelve-pole design in this configuration and therefore provides six north poles and six south poles in the circumferential direction which are arranged in alternation. In this case too, provision is made for the magnetic flux which is provided by the rotor 28 to be provided by permanent magnets which are suitably arranged in the region of the outer circumference of the rotor 28.

Each of the stator teeth 16 is also equipped with a tooth winding 22 here. The tooth winding 22 corresponds to that already explained in detail on the basis of FIG. 4, which is why reference is additionally made to the relevant statements. Each of the tooth windings 22 again has a respective first electrical conductor 24 and a respective second electrical conductor 26 which are wound onto the respective stator tooth 16 in a bifilar manner in this configuration. This synchronous machine 10 is likewise designed for application of a three-phase electrical AC voltage, wherein each of the phases is again denoted using U, V, W.

Figure 11:
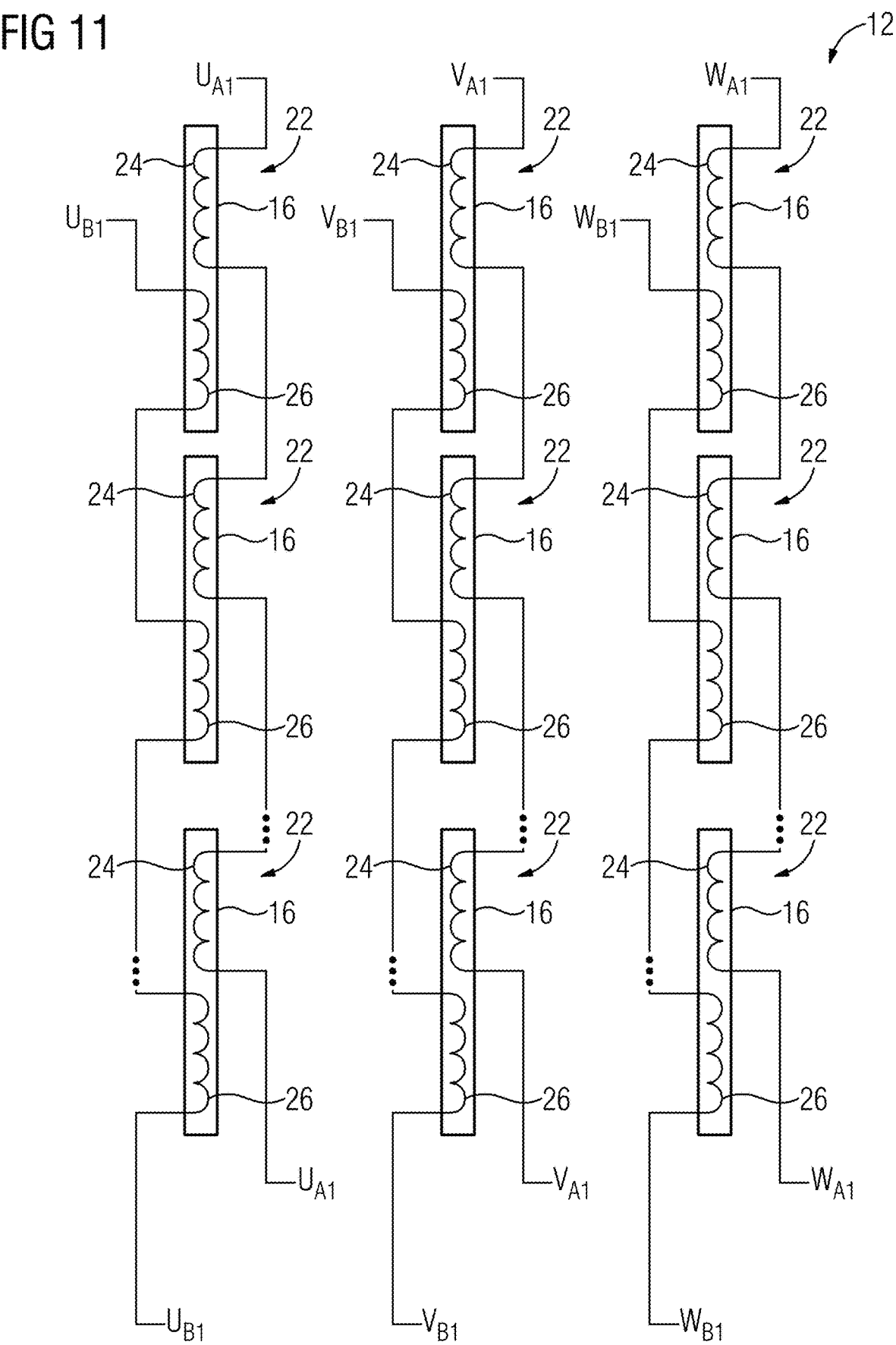
FIG. 11 shows a schematic circuit diagram illustration of the stator winding of the synchronous machine according to FIG. 10.

FIG. 11 shows an electrical connection of the tooth windings 22 for the synchronous machine 10 according to FIG. 10. However, only nine of the stator teeth 16 with the respective tooth windings 22 are illustrated in FIG. 11. It is clear from FIG. 11 that four stator teeth 16 are respectively assigned to a respective one of the phases U, V, W of the electrical three-phase AC voltage.

Figure 5:
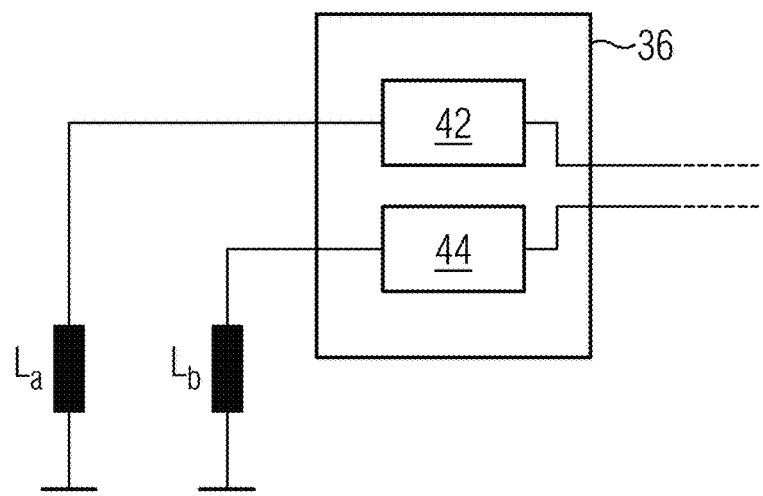
FIG. 5 shows a schematic circuit diagram view for connection of the tooth winding according to FIG. 4 to an inverter unit of an inverter for providing a multiphase electrical AC voltage.

It is also clear that each of the tooth windings has two electrical conductors 24, 26 electrically insulated from one another, as has already been explained with respect to the exemplary embodiment according to FIG. 4. In contrast to the exemplary embodiment according to FIG. 4, however, the electrical conductors 24, 26 of a respective one of the tooth windings 22 are not connected in parallel. Rather, the electrical conductors 24, 26 of the tooth windings 22 assigned to the respective phase are connected in series in phases. The corresponding connections are denoted using $U_{A1}$, $U_{B1}$, $V_{A1}$, $V_{B1}$, $W_{A1}$ and $W_{B1}$. These connections are each available in pairs on the synchronous machine 10 or its stator 12 in order to be accordingly connected to the inverter 32. FIG. 5 shows how the partial windings of the respective tooth winding 22 which are formed by the respective electrical conductors 24, 26 are connected to phase modules 42, 44 of a respective inverter unit 36 of the inverter 32.

Figure 12:
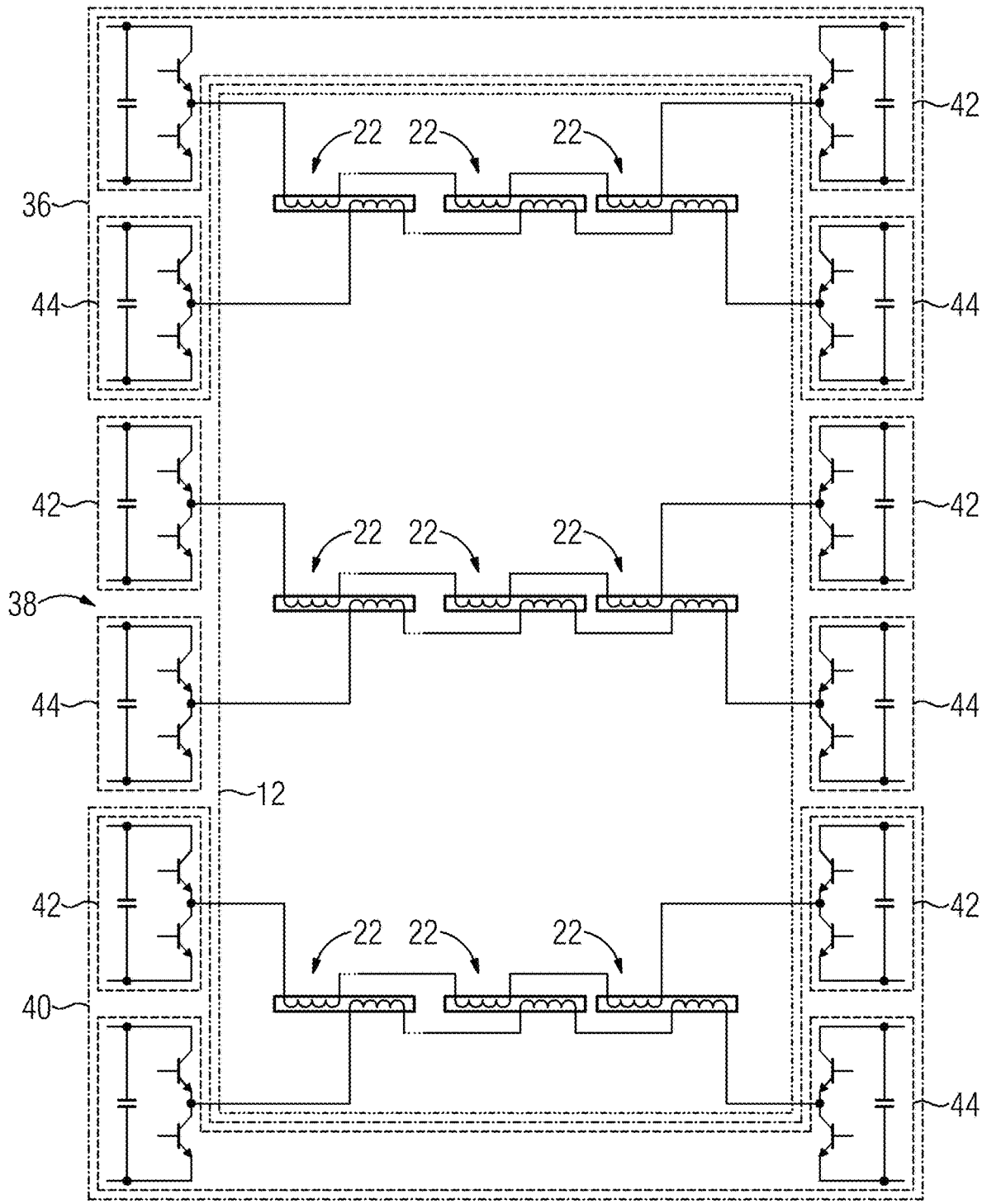
FIG. 12 shows a schematic circuit diagram illustration of an example of an electrical drive device having the synchronous machine according to FIGS. 10 and 11, which is connected to an inverter.

FIG. 12 shows the inverter 32, to which the respective winding connections $U_{A1}$, $U_{B1}$, $V_{A1}$, $V_{B1}$, $W_{A1}$ and $W_{B1}$ are connected. 12 is used in FIG. 12 to represent the stator 12 according to FIG. 11. As is clear from FIG. 12, a respective inverter unit 36, 38, 40 is provided for each of the phases U, V, W of the three-phase electrical AC voltage 34. It is also clear from FIG. 12 that each of the inverter units 36, 38, 40 has a respective first phase module 42 and a respective second phase module 44. The respective two phase modules 42, 44 each provide the same electrical phase U, V, W of the multiphase electrical AC voltage 34 in an electrically isolated manner. It is clear from FIG. 12 that the respective first electrical conductor 24 of a respective one of the tooth windings 22 is electrically connected to the corresponding first phase module 42 and the respective one of the second electrical conductors 26 of the tooth windings 22 is electrically connected to the corresponding second phase module 44. As a result, electrical energy may be applied to the electrical conductors 24, 26 in an electrically isolated manner, with the result that insulation faults may be captured, in particular a turn short circuit in a respective one of the tooth windings 22, may be captured. The electrical drive device illustrated in FIG. 12 may therefore be used to provide an insulated system, in particular an IT system, which has high fault tolerance.

It also proves to be particularly advantageous if intermediate circuit DC voltage may be applied to the inverter units 36, 38, 40 in an electrically isolated manner, with the result that electrical interactions on account of insulation faults between the inverter units 36, 38, 40, in particular between their phase modules 42, 44, may be largely avoided.

DC-isolating DC/DC converters may be additionally provided for this purpose.

The configuration according to FIG. 12 uses the advantages which result from a tooth winding formed from two electrical conductors which are electrically insulated from one another and are wound in a bifilar manner. However, the bifilar winding of a respective one of the tooth windings 22 is not absolutely necessary for the fundamental provision of the insulated system according to FIG. 12. A particularly reliable electrical drive device 30 may nevertheless be achieved thereby.

The exemplary embodiments are used only to explain the disclosure and are not intended to restrict the disclosure. In addition, the advantages and effects stated for the stator according to the disclosure likewise naturally apply to the electrical machine equipped with such a stator and to an electrical drive device equipped with such an electrical machine and vice versa. The electrical drive device need not be solely provided to be able to drive electrically driveable vehicles. The electrical drive device may also be provided for any other drive function, for example in industrial installations, in energy production installations and/or the like.

The invention claimed is:

1. A stator for a rotating electrical machine, the stator comprising:
    a laminated core providing stator teeth with respect to an air gap of the rotating electrical machine; and
    a stator winding having a plurality of tooth windings,
    wherein a respective tooth winding of the plurality of tooth windings is arranged on a respective stator tooth of the stator teeth and has a respective first electrical conductor arranged in a plurality of turns running around the respective stator tooth,
    wherein the respective tooth winding has a respective second electrical conductor which is electrically insulated from the respective first electrical conductor and has a plurality of turns arranged in a manner running around the respective stator tooth, and
    wherein the respective turns of the respective first and second electrical conductors are arranged in a bifilar manner where each turn of the plurality of turns of the first electrical conductor is respectively arranged adjacent to a turn of the second electrical conductor in a longitudinal extent of the respective tooth winding such that adjacent turns of the first electrical conductor are separated from each other by a respective turn of the second electrical conductor and adjacent turns of the second electrical conductor are separated from each other by a respective turn of the first electrical conductor.

2. The stator of claim 1, wherein the respective first electrical conductor and the respective second electrical conductor are electrically connected in parallel.

3. The stator of claim 2, wherein at least one of the first and second electrical conductors is connected in series with a fuse element.

4. The stator of claim 1, wherein at least one of the first and second electrical conductors is connected in series with a fuse element.

5. A rotating electrical machine comprising:
a stator; and
a rotor arranged rotatably with respect to the stator,
wherein the stator comprises:
a laminated core providing stator teeth with respect to an air gap of the rotating electrical machine; and
a stator winding having a plurality of tooth windings,
wherein a respective tooth winding of the plurality of tooth windings is arranged on a respective stator tooth of the stator teeth and has a respective first electrical conductor arranged in a plurality of turns running around the respective stator tooth,
wherein the respective tooth winding has a respective second electrical conductor which is electrically insulated from the respective first electrical conductor and has a plurality of turns arranged in a manner running around the respective stator tooth, and
wherein the respective turns of the respective first and second electrical conductors are arranged in a bifilar manner where each turn of the plurality of turns of the first electrical conductor is respectively arranged adjacent to a turn of the second electrical conductor in a longitudinal extent of the respective tooth winding such that adjacent turns of the first electrical conductor are separated from each other by a respective turn of the second electrical conductor and adjacent turns of the second electrical conductor are separated from each other by a respective turn of the first electrical conductor.

6. The rotating electrical machine of claim 5, wherein the rotating electrical machine is a synchronous machine.

7. The rotating electrical machine of claim 6, wherein the rotor is a permanently excited rotor.

8. The rotating electrical machine of claim 5, wherein the rotor is a permanently excited rotor.

9. An electrical drive device comprising:
an inverter for providing a multiphase electrical AC voltage, wherein, in order to provide a respective phase of the multiphase electrical AC voltage, the inverter has, for each phase, at least one inverter unit assigned to the respective phase; and
a rotating electrical machine having a stator and a rotor arranged rotatably with respect to the stator, wherein the stator has:
a laminated core providing stator teeth with respect to an air gap of the rotating electrical machine formed between the stator and the rotor; and
a stator winding having a plurality of tooth windings assigned to the respective phases of the multiphase electrical AC voltage,
wherein a respective tooth winding of the plurality of tooth windings is arranged on a respective stator tooth of the stator teeth and has a respective first electrical conductor arranged in a plurality of turns running around the respective stator tooth,
wherein the respective tooth winding has a respective second electrical conductor which is electrically insulated from the respective first electrical conductor and has a plurality of turns arranged in a manner running around the respective stator tooth,
wherein the inverter unit of a respective phase has a respective first phase module and a respective second phase module, which both provide a same respective electrical phase of the multiphase electrical AC voltage in an electrically isolated manner,
wherein the respective first electrical conductor is connected to the corresponding first phase module and the respective second electrical conductor is electrically connected to the corresponding second phase module, and
wherein the respective turns of the first and second electrical conductors of a respective tooth winding of the tooth windings are arranged in a bifilar manner where each turn of the plurality of turns of the first electrical conductor is respectively arranged adjacent to a turn of the second electrical conductor in a longitudinal extent of the respective tooth winding such that adjacent turns of the first electrical conductor are separated from each other by a respective turn of the second electrical conductor and adjacent turns of the second electrical conductor are separated from each other by a respective turn of the first electrical conductor.

10. The electrical drive device of claim 9, wherein the rotating electrical machine is a synchronous machine.

11. The electrical drive device of claim 10, wherein the rotor is a permanently excited rotor.

12. The electrical drive device of claim 11, further comprising:
a monitoring unit is configured to monitor the respective first and second electrical conductors of the tooth windings with respect to an insulation fault between the respective first electrical conductor and the respective second electrical conductor.

13. The electrical drive device of claim 9, wherein the rotor a permanently excited rotor.

14. The electrical drive device of claim 9, further comprising:
a monitoring unit is configured to monitor the respective first and second electrical conductors of the tooth windings with respect to an insulation fault between the respective first electrical conductor and the respective second electrical conductor.

* * * * *